(12) United States Patent
Sakuyama et al.

(10) Patent No.: US 9,962,775 B2
(45) Date of Patent: May 8, 2018

(54) CUTTING EDGE POSITION ADJUSTMENT MECHANISM AND CUTTING EDGE-REPLACEABLE CUTTING TOOL

(71) Applicant: MITSUBISHI MATERIALS CORPORATION, Tokyo (JP)

(72) Inventors: Toru Sakuyama, Joso (JP); Takayoshi Saito, Joso (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 210 days.

(21) Appl. No.: 14/786,006

(22) PCT Filed: Apr. 15, 2014

(86) PCT No.: PCT/JP2014/060681
§ 371 (c)(1),
(2) Date: Oct. 21, 2015

(87) PCT Pub. No.: WO2014/175114
PCT Pub. Date: Oct. 30, 2014

(65) Prior Publication Data
US 2016/0114413 A1 Apr. 28, 2016

(30) Foreign Application Priority Data

Apr. 24, 2013 (JP) ................................. 2013-091633

(51) Int. Cl.
 *B23C 5/24* (2006.01)
 *B23B 29/034* (2006.01)
(52) U.S. Cl.
 CPC ...... *B23C 5/2472* (2013.01); *B23B 29/03407* (2013.01); *B23B 2260/056* (2013.01); *B23C 2260/28* (2013.01)

(58) Field of Classification Search
CPC .......... B23B 2260/056; B23B 2260/28; B23B 29/03407; B23C 5/06; B23C 5/24;
(Continued)

(56) References Cited

U.S. PATENT DOCUMENTS 3,189,976 A * 6/1965 Pickril .............. B23B 29/03417
407/76
3,220,288 A * 11/1965 Yogus ................. B23B 29/0341
407/87
(Continued)

FOREIGN PATENT DOCUMENTS

DE 19649143 A1 6/1997
DE 102009042395 A1 * 3/2011 ........... B23B 31/005
(Continued)

OTHER PUBLICATIONS

JP 2010-99795 Machine Translation; pp. 1-13; Jul. 18, 2017.*
(Continued)

*Primary Examiner* — Sunil K Singh
*Assistant Examiner* — Nicole N Ramos
(74) *Attorney, Agent, or Firm* — Locke Lord LLP (57) ABSTRACT

Provided is a cutting edge position adjustment mechanism for moving a cutting edge member mounted on a tool body with respect to the tool body to adjust the position of a cutting edge. The cutting edge position adjustment mechanism is equipped with a shaft member that extends between the tool body and the cutting edge member and threadably engages with the tool body and a nut member that threadably engages with the shaft member and abuts against the cutting edge member; a first screw section that threadably engages with the tool body and a second screw section that threadably engages with the nut member are provided coaxially on the shaft member at different positions along the direction of an axis line of the shaft member; and the thread pitch of the
(Continued)

first screw section and the thread pitch of the second screw section are different from each other.

17 Claims, 6 Drawing Sheets

(58) Field of Classification Search
CPC . B23C 5/2472; B23C 5/247; B23C 2260/289; Y10T 407/1912; Y10T 407/1914; Y10T 407/1916; Y10T 407/1918; Y10T 407/192; Y10T 407/1922; Y10T 407/1928; Y10T 407/193; Y10T 408/83; Y10T 408/85; Y10T 408/858
See application file for complete search history.

(56) References Cited

U.S. PATENT DOCUMENTS

| | | | |
|---|---|---|---|
| 4,878,787 A | | 11/1989 | Hunt |
| 5,454,667 A | * | 10/1995 | Cirino ................. B23B 29/0341 408/153 |
| 5,800,079 A | * | 9/1998 | Qvarth .................. B23C 5/2226 144/230 |
| 2002/0154957 A1 | * | 10/2002 | Mizutani ................ B23C 5/207 407/46 |
| 2008/0175682 A1 | * | 7/2008 | Musil .................. B23B 29/0341 408/153 |

FOREIGN PATENT DOCUMENTS

| | | | | |
|---|---|---|---|---|
| EP | 2570212 A1 | * | 3/2013 | ......... B23B 29/0341 |
| FR | 2615769 A1 | | 12/1988 | |
| JP | 11-179612 A | | 7/1999 | |
| JP | 2000-288819 A | | 10/2000 | |
| JP | 2001252813 A | * | 9/2001 | ............... B23C 5/06 |
| JP | 2006150491 A | * | 6/2006 | ............... B23C 5/24 |
| JP | 2008188752 A | * | 8/2008 | ............... B23C 5/24 |
| JP | 2010-099795 A | | 5/2010 | |
| SU | 1207651 A | * | 1/1986 | ............... B23C 5/06 |

OTHER PUBLICATIONS

Supplementary European Search Report dated Nov. 15, 2016, issued for the European patent application No. 4787931.6.
International Search Report dated Jul. 8, 2014, issued for PCT/JP2014/060681.

* cited by examiner

CUTTING EDGE POSITION ADJUSTMENT MECHANISM AND CUTTING EDGE-REPLACEABLE CUTTING TOOL

TECHNICAL FIELD

The present invention relates to a cutting edge position adjustment mechanism and a cutting edge-replaceable cutting tool using the same.

BACKGROUND ART

In the related art, cutting edge-replaceable cutting tools, such as a face milling cutter equipped with a tool body that is rotated around a tool axis line, and a cutting edge member that is detachably mounted on a tip outer peripheral section of the tool body 2 and allows a cutting edge to protrude toward a tool tip side and a tool radial outer side, are known, for example, as illustrated in the following PTLs 1 and 2.

The cutting edge-replaceable cutting tools of the following PTLs 1 and 2 include a cutting edge position adjustment mechanism that moves the cutting edge member with respect to the tool body to adjust the position of the cutting edge, and specifically includes an adjusting screw that threadably engages with the tool body and that has a head section abutting against the cutting edge member, as this cutting edge position adjustment mechanism. By adjusting the amount of screwing of the adjusting screw with respect to the tool body, the cutting edge member abutting against the head section of the adjusting screw is moved, and the position (amount of protrusion from the tool body) of the cutting edge is adjusted.

CITATION LIST

Patent Literature

[PTL 1] JP-A-11-179612
[PTL 2] JP-A-2000-288819

SUMMARY OF INVENTION

Technical Problem

However, the cutting edge position adjustment mechanisms and the cutting edge-replaceable cutting tools of the related art have the following problems.

That is, in the above cutting edge position adjustment mechanisms, fine adjustment of a cutting edge position is enabled and machining precision can be improved by making the thread pitch of the adjusting screw fine. However, in this case, the rotational amount of the screw increases, and the work for adjusting the cutting edge position becomes troublesome. As a result, a large margin for positional adjustment of the cutting edge cannot be ensured. In more detail, the amount of protrusion of the cutting edge when the cutting edge member is reground is not easily ensured. As a result, the frequency of regrinding is reduced, and it is necessary to replace the cutting edge member prematurely, and thus, the life of the tools becomes short.

Meanwhile, by enlarging the thread pitch of the adjusting screw, a large margin for positional adjustment of the cutting edge can be ensured, and the life of the tool can be prolonged by increasing the frequency of regrinding. In this case, however, it is difficult to finely adjust the cutting edge position, and machining precision is not easily ensured.

The invention has been made in view of such a situation, and an object of the invention is to provide a cutting edge position adjustment mechanism and a cutting edge-replaceable cutting tool that can ensure that there is a large margin for positional adjustment of a cutting edge so as to increase the frequency of regrinding and prolong the life of the tool, and that can simplify work for adjusting the cutting edge position and enable fine adjustment of the position of the cutting edge to improve machining precision.

Solution to Problem

In order to solve such problems and achieve the above object, the invention suggests the following means.

That is, the invention provides a cutting edge position adjustment mechanism for moving a cutting edge member mounted on a tool body with respect to the tool body to adjust the position of a cutting edge of the cutting edge member. The cutting edge position adjustment mechanism includes a shaft member that is provided to extend between the tool body and the cutting edge member and threadably engages with the tool body; and a nut member that threadably engages with the shaft member and abuts against the cutting edge member. A first screw section that threadably engages with the tool body and a second screw section that threadably engages with the nut member are provided coaxially on the shaft member at mutually different positions along the direction of an axis line of the shaft member. The thread pitch of the first screw section and the thread pitch of the second screw section are different from each other.

Additionally, the invention provides a cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side. The cutting edge-replaceable cutting tool includes a cutting edge position adjustment mechanism for moving the cutting edge member with respect to the tool body to adjust the position of the cutting edge. The aforementioend cutting edge position adjustment mechanism is used as the cutting edge position adjustment mechanism.

According to the cutting edge position adjustment mechanism and the cutting edge-replaceable cutting tool using the same of the present embodiment, the shaft member is provided with the first screw section that threadably engages with the tool body, and the second screw section that threadably engages with the nut member, and the first and second screw sections are coaxially formed at mutually different positions in the direction of the axis line in this shaft member, and the thread pitches are set to be different from each other. Accordingly, the following striking effects are exerted.

That is, a large margin for positional adjustment of the cutting edge can be ensured by one screw section with a larger thread pitch out of the first and second screw sections. Accordingly, it is possible to increase the frequency of regrinding of the cutting edge, and the life of the tool can be prolonged. Additionally, by adjusting the amount of screwing of the one screw section, the cutting edge can be largely moved, and the work for adjusting the position of the cutting edge can be simply and rapidly performed.

Additionally, by adjusting the amount of screwing of the other screw section different from the one screw section with a smaller thread pitch out of the first and second screw sections, fine adjustment of the position of the cutting edge is possible, and machining precision can be sufficiently improved.

In this way, according to the invention, the above-described excellent effects can be realized by virtue of a simple configuration in which the shaft member includes the two screw sections with different pitches and the screw sections are respectively engaged with the tool body and the nut member. Moreover, according to the invention, the position of the cutting edge of the cutting edge member can be adjusted by mounting the above-described shaft member and nut member on the existing tool body.

Additionally, in the cutting edge position adjustment mechanism of the invention, the thread pitch of the first screw section may be made larger than the thread pitch of the second screw section.

In this case, the position of the cutting edge can be slightly moved (fine adjustment) by adjusting the amount of screwing of the nut member using the second screw section of this shaft member after the position of the cutting edge is largely moved by adjusting the amount of screwing of the first screw section of the shaft member that threadably engages with the tool body. That is, since large adjustment can be performed using the first screw section with a longer distance from the cutting edge member out of the first and second screw section and subsequently the fine adjustment can be performed using the second screw section with a shorter distance from the cutting edge member, the work for adjusting the position of the cutting edge can be more simply and stably performed.

Additionally, in the cutting edge position adjustment mechanism, a engaged section with which a working tool is engageable may be formed in at least any one of the shaft member and the nut member.

In this case, the working tool can be engaged to the engaged section and easily operated, and the workability of the work for adjusting the position of the cutting edge is improved. In addition, such a engaged section includes, for example, a hole, a groove, a cutout surface, or the like.

Additionally, in the cutting edge position adjustment mechanism, the nut member may have an abutting surface that abuts against the cutting edge member, and the abutting surface may assume a convex shape that swells toward the cutting edge member.

In this case, for example, even if the direction of the axis line of the shaft member is set to be different from the movement direction (forward and backward movement direction) of the cutting edge, the abutting surface of the nut member reliably abuts against the cutting edge member of the nut member irrespective of an adjustment position, and the adjustment of the position of the cutting edge described above can be stably performed with high precision.

Advantageous Effects of Invention

According to the cutting edge position adjustment mechanism and the cutting edge-replaceable cutting tool of the invention, it is possible to ensure that there is a large margin for positional adjustment of a cutting edge so as to increase the frequency of regrinding and prolong the life of the tool, and to simplify work for adjusting the cutting edge position and enable fine adjustment of the position of the cutting edge to improve machining precision.

DESCRIPTION OF EMBODIMENTS

Hereinafter, a cutting edge position adjustment mechanism 1 and a cutting edge-replaceable cutting tool 10 using the same related to an embodiment of the invention will be described with reference to the drawings.

The cutting edge-replaceable cutting tool 10 of the present embodiment is, for example, a cutting edge-replaceable face milling cutter (cutting edge-replaceable rotating tool) for finish machining.

Figure 1:
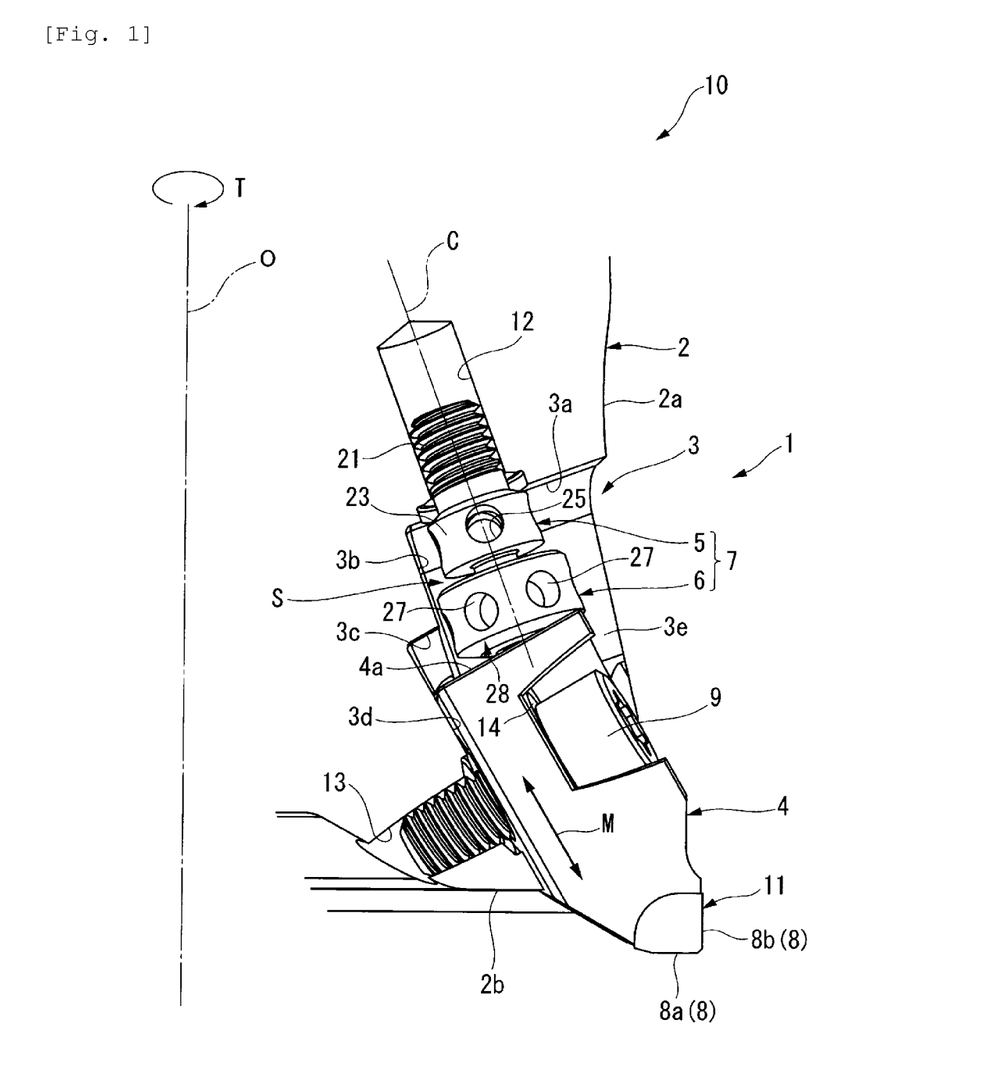
FIG. 1 is a partial side sectional view illustrating a cutting edge position adjustment mechanism and a cutting edge-replaceable cutting tool using the same related to an embodiment of the invention.

As illustrated in FIG. 1, the cutting edge-replaceable cutting tool 10 includes a tool body 2 that assumes a cylindrical shape or a columnar shape (disc shape) and is rotated around a tool axis line O, a cutting edge member 4 that is detachably mounted on a tip outer peripheral section of the tool body 2 and allows a cutting edge 8 to protrude toward at least any one of a tool tip side and a tool radial outer side, and a cutting edge position adjustment mechanism 1 that moves the cutting edge member 4 with respect to the tool body 2 and adjusts the position of the cutting edge 8. In addition, in the present embodiment, the cutting edge 8 protrudes from the tool body 2 toward both the tool tip side and the tool radial outer side.

A base end of the tool body 2 of the cutting edge-replaceable cutting tool 10 is attached to a spindle of a machine tool (not illustrated), is rotated in a tool rotational direction T around the tool axis line O, and is provided for cutting work of a work material. Additionally, the cutting edge position adjustment mechanism 1 has an adjustable threadedly-engaged body 7 that moves the cutting edge member 4 so as to be capable of adjusting the amount of protrusion of the cutting edge with respect to the tool body 2. The adjustable threadedly-engaged body 7 includes a shaft member 5 that extends between the tool body 2 and the cutting edge member 4 and threadably engages with the tool body 2, and a nut member 6 that is threadably engaged with the shaft member 5 and abuts against the cutting edge member 4.

Here, in the present specification, a cutting edge member 4 side along the direction of the tool axis line O of the tool body 2 is referred to as the tool tip side (a lower side in FIG. 1), and a side (a spindle side of the machine tool) opposite to the cutting edge member 4 along the direction of the tool axis line O is referred to as a tool base end side (an upper side in FIG. 1). Additionally, a direction orthogonal to the tool axis line O is referred to as a tool radial direction, and a direction going around the tool axis line O is referred to as a tool circumferential direction. Additionally, as for the tool circumferential direction, a direction in which the tool body 2 is rotated during cutting is referred to as the tool rotational direction T (or the front in the tool rotational direction T), and a direction opposite to the tool rotational direction T is referred to as the rear in the tool rotational direction T.

Additionally, in the description of the adjustable threadedly-engaged body 7 of the cutting edge position adjustment mechanism 1 to be described below, the cutting edge member 4 side (a downward rightward direction in FIG. 1) along a direction of an axis line C of the shaft member 5 is referred to as a threadedly-engaged body tip side, and a side (an upward leftward direction in FIG. 1) opposite to the cutting edge member 4 along the direction of the axis line C is referred to as a threadedly-engaged body base end side. Additionally, a direction orthogonal to the axis line C is referred to as a threadedly-engaged body radial direction, and a direction going around the axis line C is referred to as a threadedly-engaged body circumferential direction.

In addition, the tool tip side and the threadedly-engaged body tip side may be simply referred to as a tip side, and the tool base end side and the threadedly-engaged body base end side may be simply referred to as a base end side. In addition, the tool radial direction and the threadedly-engaged body radial direction may be simply referred as a radial direction, and the tool circumferential direction and the threadedly-engaged body circumferential direction may be simply referred to as a circumferential direction.

The tool body 2 is made of, for example, an aluminum material, a steel material, or the like, and a plurality of recessed grooves 3 extending so as to run along the direction of the tool axis line O are formed at regular intervals or at irregular intervals mutually in the circumferential direction at the tip outer peripheral section (an end on the tool tip side and an end on the tool radial outer side) of the tool body 2.

In a side sectional view (vertical sectional view) illustrated in FIG. 1, each recessed groove 3 is formed with a wall surface 3a that is directed to the tool tip side within the recessed groove 3 and is connected to an outer peripheral surface 2a of the tool body 2, a side surface 3b that is directed to the tool radial outer side within the recessed groove 3 and intersects the wall surface 3a substantially perpendicularly, an attachment surface 3d that is arranged via a stepped section 3c on the tool tip side of the side surface 3b, is formed so as to recede one step from the side surface 3b, is directed to the tool radial outer side, and is connected to a tip surface 2b of the tool body 2, and a support surface 3e that is directed to the front in the tool rotational direction T within the recessed groove 3.

In FIG. 1, the wall surface 3a and the stepped section 3c of the recessed groove 3 incline gradually toward the tool base end side as they become closer to the tool radial outer side. Additionally, the side surface 3b and the attachment surface 3d incline gradually toward the tool radial outer side as they become closer to the tool tip side. In addition, in the vertical sectional view of FIG. 1, the side surface 3b is substantially parallel to the axis line C of the adjustable threadedly-engaged body 7 to be described below, and the amount of displacement of the attachment surface 3d is set to be larger than the amount of displacement of the side surface 3b in the tool radial direction per unit length along the direction of the tool axis line O. That is, in this vertical sectional view, the inclination of the attachment surface 3d with respect to the tool axis line O is larger than the inclination of the side surface 3b with respect to the tool axis line O.

Additionally, accordingly, in the vertical sectional view of FIG. 1, the inclination angle of a movement direction M of the cutting edge member 4, which is made slidable on the attachment surface 3d, with respect to the tool axis line O is made larger than the inclination angle of the axis line C with respect to the tool axis line O. In this way, in the present embodiment, an extending direction of the axis line C of the adjustable threadedly-engaged body 7 and the movement direction M of the cutting edge member 4 are set to be different from each other.

Additionally, a screw hole 12 is drilled in the wall surface 3a so as to extend perpendicularly to the wall surface 3a. Additionally, the screw hole 13 is drilled in the attachment surface 3d so as to extend perpendicularly to the attachment surface 3d. In the illustrated example, although the screw hole 12 is a bottomed stop hole and the screw hole 13 is a through-hole, the invention is not limited to this.

A cartridge with a brazed cutting edge that is the cutting edge member 4 of the present embodiment is detachably mounted on (fixed to) the tool body 2 by a clamp screw 9 within the recessed groove 3. Specifically, the clamp screw 9 is threadably engaged with the screw hole 13 of the recessed groove 3. By loosening screwing of the clamp screw 9 into the screw hole 13, the cutting edge member 4 is slidingly movable parallel to the attachment surface 3d with respect to the recessed groove 3, particularly, in the movement direction (forward and backward movement direction) M illustrated in FIG. 1. Additionally, by tightening the screwing of the clamp screw 9 into the screw hole 13, the cutting edge member 4 is fixed to the recessed groove 3, and movement of the cutting edge member 4 is restricted.

A main body section of the cutting edge member 4 is made of a steel material or the like, and a cutting edge section 11 made of a hard material, such as cemented carbide, is integrally formed at the tip outer peripheral section of the main body section by brazing.

The main body section of the cutting edge member 4 is formed with an attachment hole 14 that passes through the main body section in the tool radial direction, and the clamp screw 9 is inserted through the attachment hole 14 and is threadably engaged with the screw hole 13 of the tool body 2. In addition, the attachment hole 14 is formed as an elongated hole or a circular hole (a hole with a larger diameter than the screw diameter of the clamp screw 9) that is elongated in the movement direction M. Accordingly, the cutting edge member 4 is made movable in the movement direction M in a state where the screwing of the clamp screw 9 is loosened.

In the main body section of the cutting edge member 4, the wall surface 4a directed to the tool base end side is made substantially parallel to the central axis of the screw hole 13, and inclines with respect to an imaginary plane perpendicular to the central axis (axis line C) of the screw hole 12. A gap S is provided between the wall surface 4a of the cutting edge member 4 and the wall surface 3a of the recessed groove 3 in a state where the cutting edge member 4 is mounted within the recessed groove 3.

Additionally, the cutting edge 8 of the cutting edge section 11 protrudes from the tool body 2 toward the tool tip side and the tool radial outer side in a state where the cutting edge member 4 is mounted on the tool body 2 in this way. Specifically, a front cutting edge 8a that forms one side on the tool tip side in the cutting edge 8 that assumes a substantial L shape is arranged from the tip surface 2b of the tool body 2 toward the tool tip side, and an peripheral cutting edge 8b that forms one side on the tool radial outer side is arranged to protrude from the outer peripheral surface 2a of the tool body 2 toward the tool radial outer side. The front cutting edge 8a of the cutting edges 8 extends perpendicularly to the tool axis line O, and the peripheral cutting edge 8b extends so as to run along the tool axis line O. In the example illustrated in FIG. 1, a corner edge that inclines so as to intersect the cutting edges 8a and 8b at obtuse angles, respectively is formed between the front cutting edge 8a and the peripheral cutting edge 8b in the cutting edge 8, and couples the cutting edges 8a and 8b.

As illustrated in FIGS. 1 to 5, a first screw section 21 that threadably engages with the screw hole 12 of the tool body 2, and a second screw section 22 that threadably engages with the nut member 6 are coaxially provided at mutually different positions of the shaft member 5 along the direction of the axis line C, in the shaft member 5 of the adjustable threadedly-engaged body 7.

Figure 5:
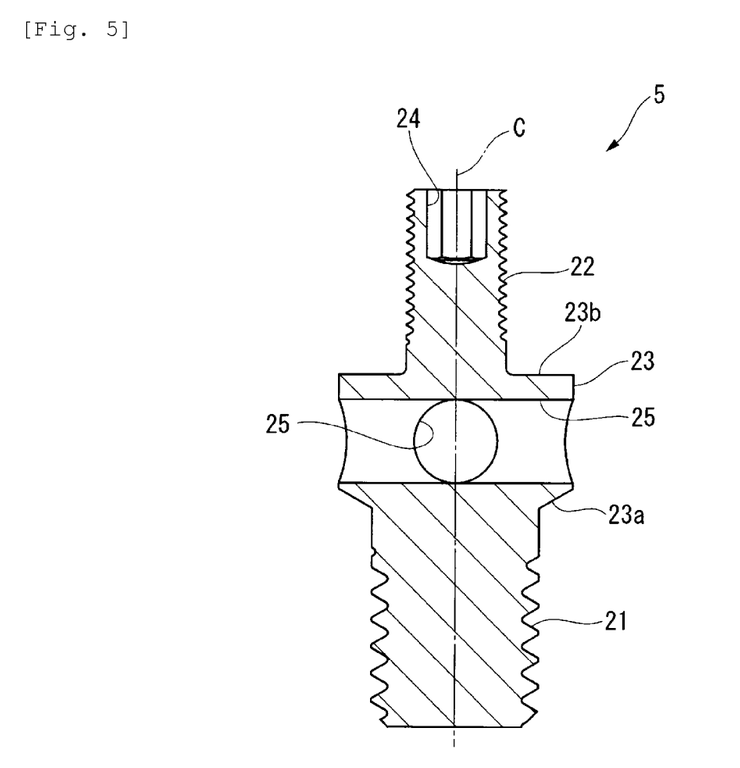
FIG. 5 is a side sectional view of the shaft member in the cutting edge position adjustment mechanism.

Specifically, both of the first and second screw sections 21 and 22 are male screw sections, the first screw section 21 is formed on the portion of the shaft member 5 on the threadedly-engaged body base end side (the lower side in FIG. 5), and the second screw section 22 is formed on the portion of the shaft member 5 on the threadedly-engaged body tip side (the upper side in FIG. 5). Additionally, the shaft member 5 is formed with a shaft body 23 that is located between the first and second screw sections 21 and 22 and forms an outermost diameter portion of the shaft member 5. The external diameter of the shaft member 5 is made smaller in order of the shaft body 23, the first screw section 21, and the second screw section 22.

Also, as illustrated in FIGS. 4(b) and 5, the thread pitch of the first screw section 21 and the thread pitch of the second screw section 22 are different from each other. Specifically, the thread pitch of the first screw section 21 is made larger than the thread pitch of the second screw section 22. That is, the lead (that is, the amount of displacement by which a thread ridge (valley) moves in the direction of the axis line C while making one rotation in the threadedly-engaged body circumferential direction) of the thread of the first screw section 21 is set to be larger than the lead of the thread of the second screw section 22. Additionally, the height (depth) of the thread ridge (valley) of the first screw section 21 along the threadedly-engaged body radial direction is made larger than the height of the thread ridge (valley) of the second screw section 22.

In addition, in the illustrated example, the portion of the first screw section 21 adjacent to the shaft body 23 and the portion of the second screw section 22 adjacent to the shaft body 23 are respectively formed with non-screw sections. However, the non-screw sections may not be formed. That is, the first and second screw sections 21 and 22 may be formed with male screw portions extending up to the portions of the first and second screw sections adjacent to the shaft body 23 (over the entire lengths of the screw sections 21 and 22). It should be noted herein that it is preferable that the screw length of the second screw section 22 along the direction of the axis line C is made equal to or less than the entire length of the nut member 6 (to be described below) along the direction of the axis line C. Accordingly, the second screw section 22 is prevented from protruding toward from the nut member 6 toward a threadedly-engaged body tip side, and the contact between the second screw section 22 and the wall surface 4a of the cutting edge member 4 is prevented.

Additionally, in the present embodiment, the direction of the thread of the first screw section 21 and the direction of the thread of the second screw section 22 are the same direction as each other, and both of these first and second screw sections are right-handed screws in illustrated examples. In addition, the term "right-handed screws" herein refers to screws that are moved forward and tightened when the screws are rotated clockwise around the axis line C and that are moved backward and loosened when the screws are rotated counterclockwise. In addition, both the direction of the thread of the first screw section 21 and the direction of the thread of the second screw section 22 may be left-handed screws (directions reverse to the above right-handed screws). That is, the left-handed screws may be so-called reverse screws that are moved forward and tightened when the screws are rotated counterclockwise around the axis line C and that are moved backward and loosened when the screws are rotated clockwise. Additionally, the direction of the thread of the first screw section 21 and the direction of the thread of the second screw section 22 may be mutually different directions, that is, any one of the screw sections 21 and 22 may be a right-handed screw and the other thereof may be a left-handed screw.

Figure 3:
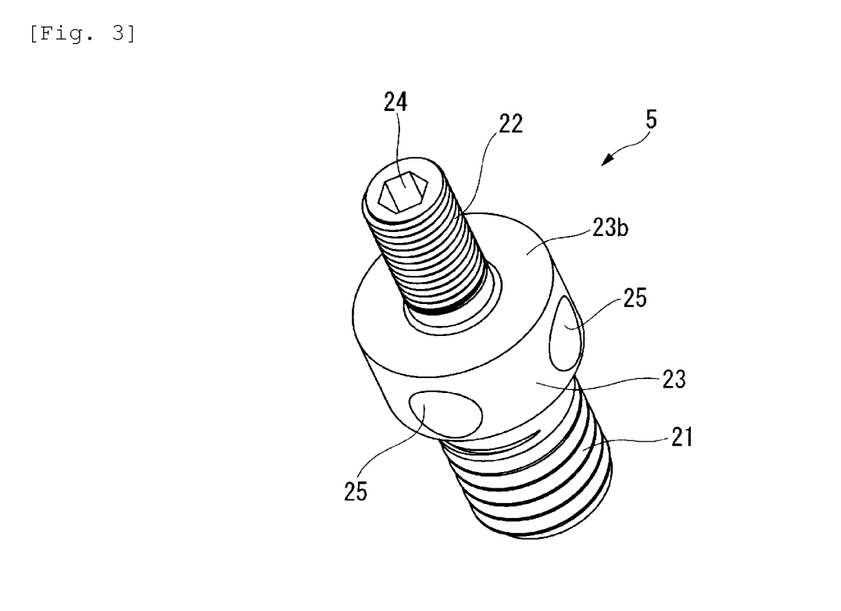
FIG. 3 is a perspective view illustrating the shaft member in the cutting edge position adjustment mechanism.
Figure 4:
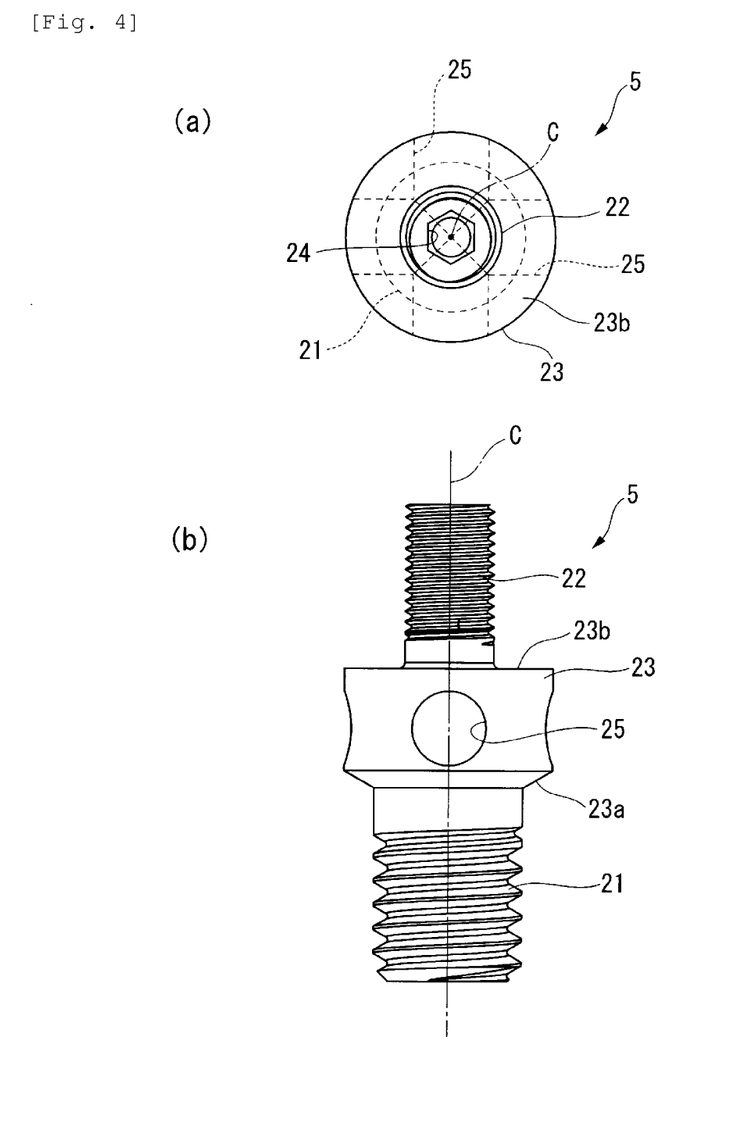
FIG. 4(a) is a front view of the shaft member in the cutting edge position adjustment mechanism.
FIG. 4(b) is a side view of the of the shaft member.

Additionally, as illustrated in FIGS. 3, 4(a), and 5, the end surface of the second screw section 22 of the shaft member 5 that faces the threadedly-engaged body tip side is formed with a hole 24 with which a working tool (not illustrated), such as a hexagon wrench, is engageable. In the illustrated example, the hole 24 is a bottomed stop hole that extends on the axis line C.

An end surface 23a of the shaft body 23 that faces the threadedly-engaged body base end side assumes a tapered shape that gradually inclines toward the threadedly-engaged body base end side as it become closer to a radial inner side of the threadedly-engaged body from an outer peripheral surface of the shaft body 23. Additionally, an end surface 23b of the shaft body 23 that faces the threadedly-engaged body tip side is formed in a planar shape perpendicular to the axis line C.

Additionally, the shaft body 23 is formed with an operation hole (engaged section) 25 that passes through the shaft body 23 in the threadedly-engaged body radial direction. Both ends of the operation hole 25 open to an outer peripheral surface of the shaft body 23, respectively, and a working tool (not illustrated), such as a pin member, is capable of being inserted into and engaged to the operation hole 25. As illustrated in FIG. 4(a), in the present embodiment, a plurality of the operation holes 25 extend in threadedly-engaged body radial directions that are different from each other and are formed within the shaft body 23, and intersect each other on the axis line C. Accordingly, a plurality of openings of the respective operation holes 25 are formed at predetermined intervals in the circumferential direction in the outer peripheral surface of the shaft body 23. In the illustrated example, two operation holes 25 that pass through the shaft body 23 are formed so as to be orthogonal to each other on the axis line C. Accordingly, four openings of the operation holes 25 are formed at regular intervals in the circumferential direction in the outer peripheral surface of the shaft body 23. In addition, the operation holes 25 may be bottomed stop holes instead of the through-holes. However, when the operation holes 25 are formed as the through-holes as in the present embodiment, this is more preferable because a working tool, such as a pin member, can be deeply inserted into an operation hole 25, and the operability capable of rotating the shaft body 23 around the axis line C is improved.

Figure 6:
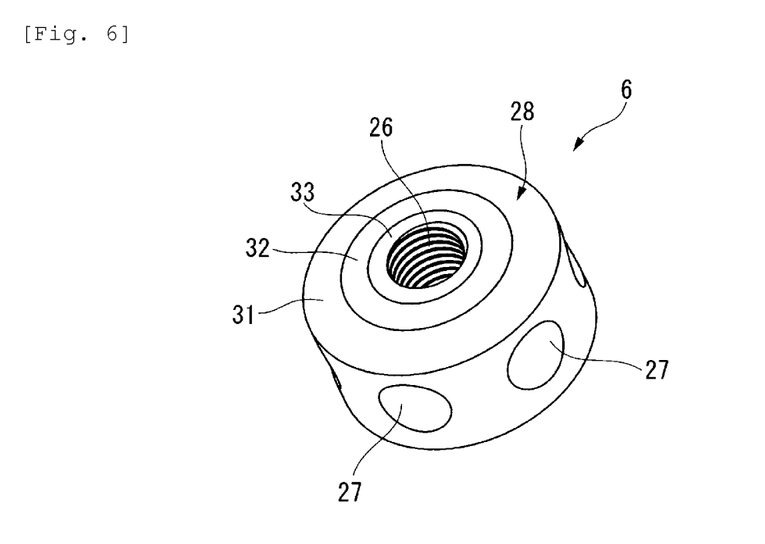
FIG. 6 is a perspective view illustrating the nut member in the cutting edge position adjustment mechanism.
Figure 7:
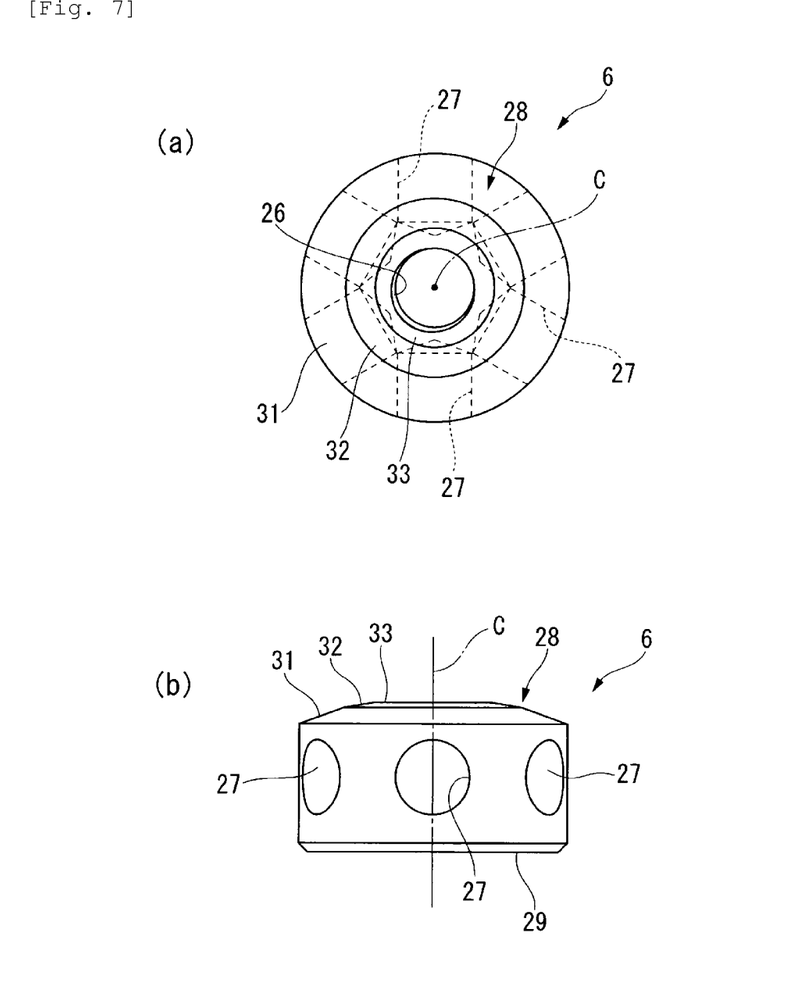
FIG. 7(a) is a front view of the nut member in the cutting edge position adjustment mechanism.
FIG. 7(b) is a side view of the of the nut member.
Figure 8:
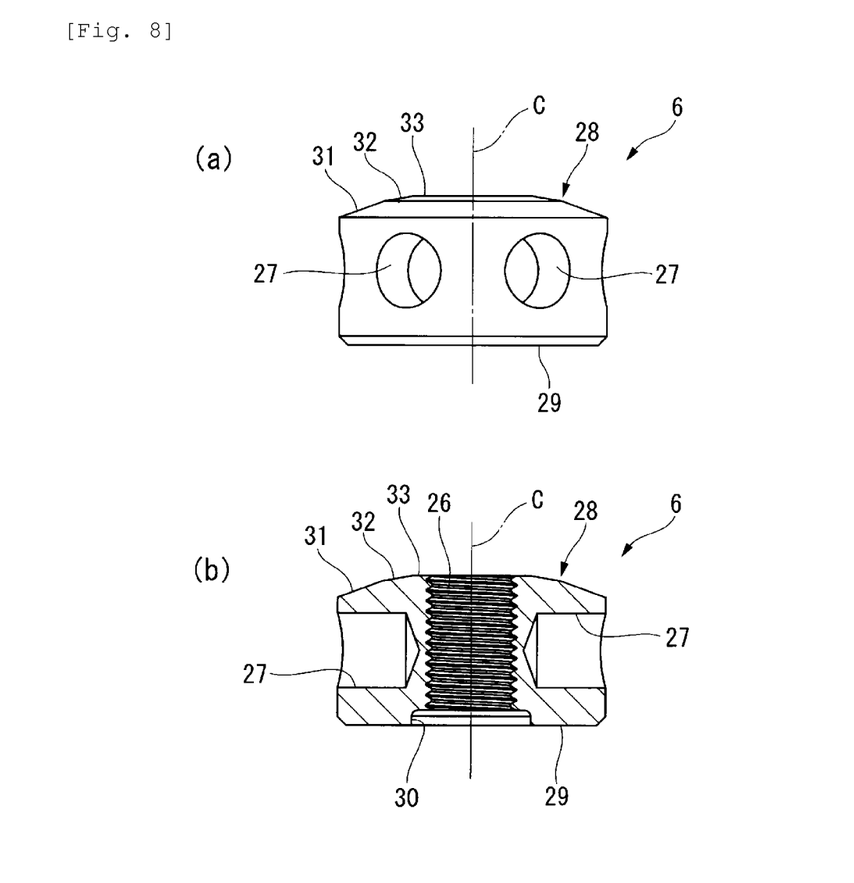
FIG. 8(a) is a side view of the nut member in the cutting edge position adjustment mechanism.
FIG. 8(b) is a side sectional view of the of the nut member.

As illustrated in FIGS. 6 to 8, the nut member 6 of the adjustable threadedly-engaged body 7 assumes a tubular shape or an annular shape (a ring shape), and an inner peripheral surface of this nut member 6 is formed with a female screw section 26 that threadably engages with the second screw section 22 of the shaft member 5. Additionally, in the illustrated example, the external diameter of the nut member 6 is made larger than the external diameter of the shaft body 23 of the shaft member 5.

Additionally, an operation hole (engaged section) 27 that extends in the threadedly-engaged body radial direction opens to an outer peripheral surface of the nut member 6. A working tool (not illustrated), such as a pin member, is capable of being inserted into and engaged to the operation hole 27. In the present embodiment, a plurality of the operation holes 27 are formed at predetermined intervals in the threadedly-engaged body circumferential direction in the outer peripheral surface of the nut member 6. Additionally, the number of openings of the operation holes 27 opening to the outer peripheral surface of the nut member 6 is more than the number of openings of the operation holes 25 opening to the outer peripheral surface of the shaft body 23, and this enables screw adjustment using the nut member 6 to be more minutely performed. Specifically, in FIG. 7(a), six operation holes 27 are formed at regular intervals in the threadedly-engaged body circumferential direction in the outer peripheral surface of the nut member 6, and these operation holes 27 are bottomed stop holes and do not reach the female screw section 26. Additionally, in the illustrated example, the internal diameter of the operation holes 27 and the internal diameter of the operation holes 25 may be the same diameter as each other.

Figure 2:
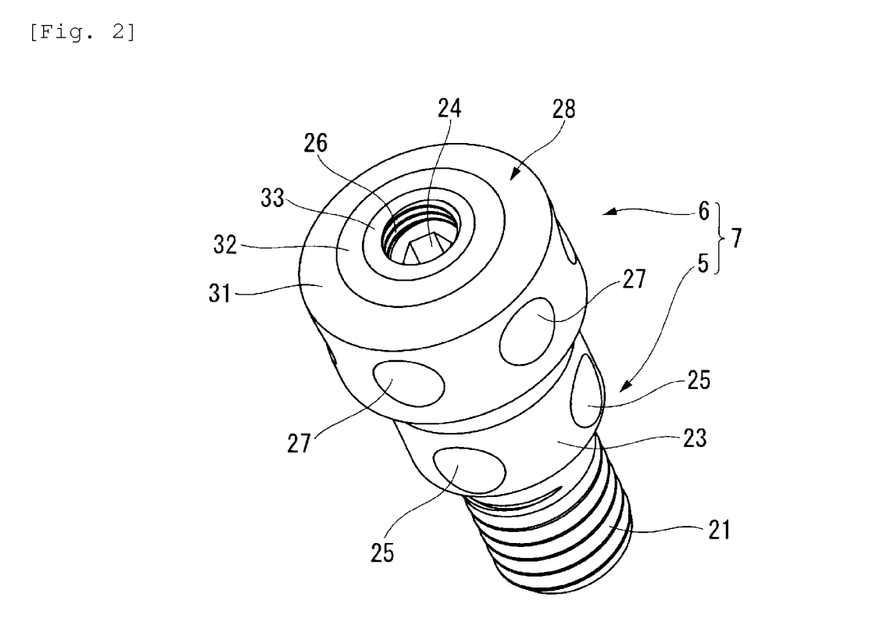
FIG. 2 is a perspective view illustrating a state (adjustable threadedly-engaged body) where a shaft member and a nut member in the cutting edge position adjustment mechanism have engaged with each other.

As illustrated in FIGS. 1 and 2, an end surface 28 of the nut member 6 that faces the threadedly-engaged body tip side assumes a convex shape that swells toward the threadedly-engaged body tip side in a state where the female screw section 26 of the nut member 6 and the second screw section 22 of the shaft member 5 are threadably engaged with each other, and the end surface 28 is formed as an abutting surface that abuts against the wall surface 4a of the cutting edge member 4.

In the present embodiment, in FIGS. 6 to 8, the abutting surface 28 consists of a plurality of tapered surfaces (inclined surfaces) with mutually different inclinations and a plane, and specifically includes a first inclined surface 31, a second inclined surface 32, and a planar surface 33 in this order from the outer peripheral surface of the nut member 6 toward the threadedly-engaged body radial inner side.

As illustrated in FIGS. 8(a) and 8(b), compared to the amount of displacement of the first inclined surface 31 directed to the direction of the axis line C per unit length along the threadedly-engaged body radial direction, the amount of displacement of the second inclined surface 32 is set to be smaller. That is, the inclination of the first inclined surface 31 with respect to an imaginary plane perpendicular to the axis line C is larger than the inclination of the second inclined surface 32 with respect to the imaginary plane. Additionally, the planar surface 33 is formed as a flat surface perpendicular to the axis line C. Accordingly, circumferential ridgelines are respectively formed between the first inclined surface 31 and the second inclined surface 32 and between the second inclined surface 32 and the planar surface 33.

Additionally, an end surface 29 of the nut member 6 that faces the threadedly-engaged body base end side is formed as a flat surface perpendicular to the axis line C, and a chamfered portion is formed between the end surface 29 and the outer peripheral surface of the nut member 6, and extends along the threadedly-engaged body circumferential direction.

In FIG. 8(b), the opening of the female screw section 26 of the nut member 6 opening to the end surface 29 is a large diameter hole 30 having a larger diameter than regions other than this opening.

In the adjustable threadedly-engaged body 7 in which the shaft member 5 and the nut member 6 configured in this way are threadably engaged with each other, as illustrated in FIG. 1, the first screw section 21 of the shaft member 5 is threadably engaged with the screw hole 12 of the tool body 2. Accordingly, the shaft body 23 and the second screw section 22 of the shaft member 5, and the nut member 6 are provided to protrude into the recessed groove 3, and the shaft body 23, the second screw section 22, and the nut member 6 are arranged in a gap S within the recessed groove 3. In addition, when the first screw section 21 of the shaft member 5 is threadably engaged with the screw hole 12, workability is excellent if a working tool, such as a hexagon wrench, is engaged to the hole 24 of the shaft member 5 and screwed around the axis line C in a state where the cutting edge member 4 and the clamp screw 9 are detached from the inside of the recessed groove 3.

If the adjustable threadedly-engaged body 7 is mounted into the recessed groove 3, the cutting edge member 4 is attached into the recessed groove 3 with the clamp screw 9. The clamp screw 9 is brought into a temporarily fixed state before the adjustment of the position of the cutting edge 8 of the cutting edge member 4. By operating the working tool engaged to the operation hole 25 to rotate the shaft member 5 around the axis line C with respect to the screw hole 12 or operating the working tool engaged to the operation hole 27 to rotate the nut member 6 around the axis line C with respect to the shaft member 5 from a state where the abutting surface of the nut member 6 of the adjustable threadedly-engaged body 7 has abutted against the wall surface 4a of the cutting edge member 4, the abutting surface 28 is advanced in the direction of the axis line C and the wall surface 4a is pressed, and the cutting edge member 4 is advanced in the movement direction M and the position of the cutting edge 8 is adjusted. After the adjustment of the position of the cutting edge 8, the clamp screw 9 is tightened and the cutting edge member 4 is fixed into the recessed groove 3.

In addition, if the working tool is engaged to the operation hole 27, the nut member 6 is rotated around the axis line C, and fine adjustment of the position of the cutting edge 8 is performed after the clamp screw 9 is finally tightened and the cutting edge member 4 is fixed in a state where the working tool is engaged to the operation hole 25, the shaft member 5 is rotated around the axis line C, and rough adjustment of the position of the cutting edge 8 is adjusted, this is more preferable because a change (vibration change) in the position of the cutting edge 8 of about several micrometers caused when the clamp screw 9 is finally tightened can be prevented, cutting edge vibration precision is further improved, and the workability of adjustment is improved.

According to the cutting edge position adjustment mechanism 1 and the cutting edge-replaceable cutting tool using the same related to the present embodiment described above, the shaft member 5 is provided with the first screw section 21 that threadably engages with the tool body 2, and the second screw section 22 that threadably engages with the nut member 6, the first and second screw sections 21 and 22 are coaxially formed at mutually different positions in the direction of the axis line C in this shaft member 5, and the thread pitches are set to be different from each other. Accordingly, the following striking effects are exerted.

That is, a large margin for positional adjustment of the cutting edge 8 can be ensured by one screw section (the first screw section 21 in the present embodiment) with a larger thread pitch out of the first and second screw sections 21 and 22. Accordingly, it is possible to increase the frequency of regrinding of the cutting edge 8, and the life of the tool can be prolonged. Additionally, by adjusting the amount of screwing of the one screw section, the cutting edge 8 can be largely moved, and the work for adjusting the position of the cutting edge 8 can be simply and rapidly performed.

Additionally, by adjusting the amount of screwing of the other screw section (the second screw section 22 in the present embodiment) different from the one screw section with a smaller thread pitch out of the first and second screw sections 21 and 22, fine adjustment of the position of the cutting edge 8 is possible, and machining precision can be sufficiently improved.

Particularly, when the cutting edge-replaceable cutting tool 10 is the aforementioned cutting edge-replaceable face milling cutter for finish machining, this is preferable because cutting edge vibration precision is simply and stably ensured with high precision.

In this way, according to the present embodiment, the above-described excellent effects can be realized by virtue of a simple configuration in which the shaft member 5 includes the two screw sections 21 and 22 with different pitches and the screw sections 21 and 22 are respectively engaged with the tool body 2 and the nut member 6. Moreover, according to the present embodiment, the position of the cutting edge 8 of the cutting edge member can be adjusted by mounting the above-described shaft member 5 and nut member 6 (adjustable threadedly-engaged body 7) on the existing tool body 2.

Specifically, in the present embodiment, the thread pitch of the first screw section 21 is made larger than the thread pitch of the second screw section 22. Thus, the following effects are exerted.

That is, the position of the cutting edge 8 can be slightly moved (fine adjustment) by adjusting the amount of screwing of the nut member 6 using the second screw section 22 of this shaft member 5 after the position of the cutting edge 8 is largely moved by adjusting the amount of screwing of the first screw section 21 of the shaft member 5 that threadably engages with the tool body 2. That is, since large adjustment can be performed using the first screw section 21 with a longer distance from the cutting edge member 4 out of the first and second screw section 21 and 22 and subsequently the fine adjustment can be performed using the second screw section 22 with a shorter distance from the cutting edge member 4, the work for adjusting the position of the cutting edge 8 can be more simply and stably performed.

Specifically, for example, the thread pitch (lead) of the first screw section 21 can be in units of tens of micrometers to several millimeters, and the thread pitch of the second screw section 22 can be in units of several micrometers to hundreds of micrometers smaller than the first screw section 21. Additionally, although metric coarse threads are adopted for the first and second screw sections 21 and 22, the invention is not limited to this, and may be a metric fine thread, a unified coarse thread, a unified fine thread, or the like other than these metric coarse threads.

Additionally, since the operation holes 25 and the operation holes 27 are formed in both of the shaft body 23 of the shaft member 5 and the nut member 6 as engaged sections with which a working tool is engageable, the working tool can be engaged to these engaged sections and easily operated, and the workability of the work for adjusting the position of the cutting edge 8 is improved. In addition, since the engaged sections are sufficient if shapes with which a working tool is engageable are provided, for example, grooves, cutout surfaces, or the like in addition to the aforementioned operation holes 25 and operation holes 27 may be used as such engaged sections. Moreover, the engaged sections may not be formed in the shaft member 5 and/or the nut member 6.

Additionally, the nut member 6 has the abutting surface 28 that abuts against the cutting edge member 4, and the abutting surface 28 has the convex shape that swells toward the cutting edge member 4. Thus, for example, even if the direction of the axis line C of the shaft member 5 is set to be different from the movement direction (forward and backward movement direction) M of the cutting edge 8 as described in the present embodiment, the abutting surface 28 of the nut member 6 reliably abuts against the wall surface 4a of the cutting edge member 4 irrespective of an adjustment position, and the adjustment of the position of the cutting edge 8 described above can be stably performed with high precision. In addition, in the present embodiment, the abutting surface 28 has the first inclined surface 31, the second inclined surface 32, and the planar surface 33. However, the shape of the abutting surface 28 is not limited to this. That is, the abutting surface 28 may be formed, for example, in a convex surface shape, a semispherical surface, or the like that swells toward the cutting edge member 4. Additionally, the direction of the axis line C of the shaft member 5 and the movement direction M of the cutting edge 8 may be the same direction. In this case, the abutting surface 28 may be a flat surface.

Additionally, in the present embodiment, in the vertical sectional view of FIG. 1, the direction of the axis line C and the movement direction M are different from each other, specifically, the inclination of the movement direction M with respect to the tool axis line O is made larger than the inclination (inclination angle) of the axis line C with respect to the tool axis line O. Thus, the following effects are exerted.

That is, the movement distance of the cutting edge member 4, abutting against the adjustable threadedly-engaged body, along the direction of the tool axis line O is made smaller than the movement distance of the adjustable threadedly-engaged body 7 along the direction of the tool axis line O when the adjustable threadedly-engaged body 7 is advanced and retreated in the direction of the axis line C with respect to the recessed groove 3 of the tool body 2. Therefore, fine adjustment of the position of the cutting edge 8 directed to the direction of the tool axis line O can be performed with higher precision.

In addition, the invention is not limited to the aforementioned embodiment, and various changes can be made without departing from the scope of the invention.

For example, in the above-described embodiment, the cutting edge-replaceable cutting tool 10 equipped with the cutting edge position adjustment mechanism 1 has been described using the cutting edge-replaceable face milling cutter for finish machining. However, cutting edge-replaceable rotating tools, such as a face milling cutter and an end mill other than the cutting edge-replaceable face milling cutter for finish machining, may be used. Otherwise, the cutting edge position adjustment mechanism of the invention may be adopted for a cutting edge-replaceable turning tool.

Additionally, although the cutting edge 8 of the cutting edge member 4 mounted on the tool body 2 that is rotated around the tool axis line O protrudes toward both the tool tip side and the tool radial outer side, the cutting edge 8 may be projected and made to protrude only to either the tool tip side or the tool radial outer side.

Additionally, in the above-described embodiment, the cutting edge member 4 has been described using a cartridge with a brazed cutting edge. However, the invention is not limited to this, and the cutting edge member 4 may be a cutting insert attachable/detachable cartridge or a cutting insert itself other than the cartridge with a brazed cutting edge.

Additionally, in the aforementioned embodiment, the thread pitch of the first screw section 21 is made larger than the thread pitch of the second screw section 22. Contrary to this, however, the thread pitch of the first screw section 21 may be made smaller than the thread pitch of the second screw section 22. In this case, contrary to the aforementioned embodiment, the first screw section 21 is formed as a screw for finely adjusting the position of the cutting edge 8, and the second screw section 22 is formed as a screw for large adjustment.

Additionally in the aforementioned embodiment, in the vertical sectional view of FIG. 1, the direction of the axis line C and the movement direction M are different from each other, specifically, the inclination of the movement direction M with respect to the tool axis line O is made larger than the inclination (inclination angle) of the axis line C with respect to the tool axis line O. However, the invention is not limited to this. That is, the inclination of the movement direction M with respect to the tool axis line O may be made smaller than the inclination of the axis line C with respect to the tool axis line O. In this case, the movement distance of the cutting edge member 4, abutting against the adjustable threadedly-engaged body, along the direction of the tool radial direction is made smaller than the movement distance of the adjustable threadedly-engaged body 7 along the tool radial direction when the adjustable threadedly-engaged body 7 is advanced and retreated in the direction of the axis line C with respect to the recessed groove 3 of the tool body 2. Therefore, fine adjustment of the position of the cutting edge 8 directed to the tool radial direction can be performed with higher precision.

Otherwise, in the vertical sectional view of FIG. 1, the direction of the axis line C and the movement direction M may be the same direction (parallel) as each other. Additionally, the direction of the axis line C and/or the movement direction M may be parallel to the tool axis line O.

Additionally, although a case where the external diameter of the shaft member 5 is made smaller in order of the shaft body 23, the first screw section 21, and the second screw section 22 has been described in the above-described embodiment, the invention is not limited to this. That is, in the shaft member 5, the external diameter of the shaft body 23 may be smaller than the external diameter of the first screw section 21.

In addition, the respective components (constituent elements) described in the aforementioned embodiment, modifications, and the like may be combined without departing from the scope of the invention, and additions, omissions, substitutions, and other alternations of components can be made. Additionally, the invention is not limited by the aforementioned embodiment, and is limited only by the appended claims.

REFERENCE SIGNS LIST

1: CUTTING EDGE POSITION ADJUSTMENT MECHANISM
2: TOOL BODY
4: CUTTING EDGE MEMBER
5: SHAFT MEMBER
6: NUT MEMBER
8: CUTTING EDGE
10: CUTTING EDGE-REPLACEABLE CUTTING TOOL
21: FIRST SCREW SECTION
22: SECOND SCREW SECTION
25: OPERATION HOLE (ENGAGED SECTION)
27: OPERATION HOLE (ENGAGED SECTION)
28: END SURFACE (ABUTTING SURFACE)
C: AXIS LINE
O: TOOL AXIS LINE

The invention claimed is:

1. A cutting edge position adjustment mechanism for moving a cutting edge member mounted on a tool body with respect to the tool body to adjust the position of a cutting edge of the cutting edge member, the cutting edge position adjustment mechanism comprising:
    a shaft member that is provided to extend between the tool body and the cutting edge member and threadably engages with the tool body; and
    a nut member that threadably engages with the shaft member and abuts against the cutting edge member,
    wherein a first screw section that threadably engages with the tool body and a second screw section that threadably engages with the nut member are provided coaxially on the shaft member at mutually different positions along the direction of an axis line of the shaft member,
    wherein the thread pitch of the first screw section and the thread pitch of the second screw section are different from each other,
    wherein, the shaft member includes at least one operation hole, and the nut member includes at least one operation hole.

2. The cutting edge position adjustment mechanism according to claim 1,
    wherein the thread pitch of the first screw section is made larger than the thread pitch of the second screw section.

3. The cutting edge position adjustment mechanism according to claim 1,
    wherein an engaged section with which a working tool is engageable is formed in at least any one of the shaft member and the nut member.

4. The cutting edge position adjustment mechanism according to claim 1,
    wherein the nut member has an abutting surface that abuts against the cutting edge member, and
    wherein the abutting surface assumes a convex shape that swells toward the cutting edge member.

5. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
    a cutting edge position adjustment mechanism for moving the cutting edge member with respect to the tool body to adjust the position of the cutting edge, and
    wherein the cutting edge position adjustment mechanism according to claim 1 is used as the cutting edge position adjustment mechanism.

6. The cutting edge position adjustment mechanism according to claim 2,
    wherein an engaged section with which a working tool is engageable is formed in at least any one of the shaft member and the nut member.

7. The cutting edge position adjustment mechanism according to claim 2,
  wherein the nut member has an abutting surface that abuts against the cutting edge member, and
  wherein the abutting surface assumes a convex shape that swells toward the cutting edge member.

8. The cutting edge position adjustment mechanism according to claim 3,
  wherein the nut member has an abutting surface that abuts against the cutting edge member, and
  wherein the abutting surface assumes a convex shape that swells toward the cutting edge member.

9. The cutting edge position adjustment mechanism according to claim 6,
  wherein the nut member has an abutting surface that abuts against the cutting edge member, and
  wherein the abutting surface assumes a convex shape that swells toward the cutting edge member.

10. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
  a cutting edge position adjustment mechanism for moving the cutting edge member with respect to the tool body to adjust the position of the cutting edge, and
  wherein the cutting edge position adjustment mechanism according to claim 2 is used as the cutting edge position adjustment mechanism.

11. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
  a cutting edge position adjustment mechanism for moving the cutting edge member with respect to the tool body to adjust the position of the cutting edge, and
  wherein the cutting edge position adjustment mechanism according to claim 3 is used as the cutting edge position adjustment mechanism.

12. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
  a cutting edge position adjustment mechanism for moving the cutting edge member with respect to the tool body to adjust the position of the cutting edge, and
  wherein the cutting edge position adjustment mechanism according to claim 4 is used as the cutting edge position adjustment mechanism.

13. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
  a cutting edge position adjustment mechanism for moving the cutting edge member with respect to the tool body to adjust the position of the cutting edge, and
  wherein the cutting edge position adjustment mechanism according to claim 6 is used as the cutting edge position adjustment mechanism.

14. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
  a cutting edge position adjustment mechanism for moving the cutting edge member with respect to the tool body to adjust the position of the cutting edge, and
  wherein the cutting edge position adjustment mechanism according to claim 7 is used as the cutting edge position adjustment mechanism.

15. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
  a cutting edge position adjustment mechanism for moving the cutting edge member with respect to the tool body to adjust the position of the cutting edge, and
  wherein the cutting edge position adjustment mechanism according to claim 8 is used as the cutting edge position adjustment mechanism.

16. A cutting edge-replaceable cutting tool including a tool body rotated around a tool axis line, and a cutting edge member detachably mounted on a tip outer peripheral section of the tool body and allowing a cutting edge to protrude toward at least any one of a tool tip side and a tool radial outer side, the cutting edge-replaceable cutting tool comprising:
  a cutting edge position adjustment mechanism for moving the cutting edge member with respect to the tool body to adjust the position of the cutting edge, and
  wherein the cutting edge position adjustment mechanism according to claim 9 is used as the cutting edge position adjustment mechanism.

17. The cutting edge position adjustment mechanism according to claim 1,
  wherein each shaft member operation hole is positioned at the outer peripheral surface of the shaft member and faces radially outward.

* * * * *